United States Patent [19]

Imagawa

[11] Patent Number: 5,387,820
[45] Date of Patent: Feb. 7, 1995

[54] POWER SUPPLY CIRCUIT

[75] Inventor: Yasumi Imagawa, Kanazawa, Japan

[73] Assignee: Matsushita Electric Industrial Co., Ltd., Osaka, Japan

[21] Appl. No.: 914,519

[22] Filed: Jul. 17, 1992

[30] Foreign Application Priority Data

Aug. 8, 1991 [JP] Japan .................. 3-199125

[51] Int. Cl.6 .................................. H02M 3/00
[52] U.S. Cl. ........................... 307/31; 307/34; 307/39
[58] Field of Search ............... 307/33, 34, 38, 39, 307/31, 46, 58, 66, 110, 80, 82, 87, 130, 140, 141.4; 361/187

[56] References Cited

U.S. PATENT DOCUMENTS

| | | | |
|---|---|---|---|
| 4,221,111 | 9/1980 | Onda et al. | 368/35 |
| 4,435,745 | 3/1984 | Eisele et al. | 363/21 |
| 4,451,743 | 5/1984 | Suzuki et al. | 307/110 |
| 5,161,097 | 11/1992 | Ikeda | 363/124 |

FOREIGN PATENT DOCUMENTS 251335 2/1990 Japan .
168397 6/1991 Taiwan, Prov. of China .
2079498 1/1982 United Kingdom .

*Primary Examiner*—Marc S. Hoff
*Assistant Examiner*—Richard T. Elms
*Attorney, Agent, or Firm*—Stevens, Davis, Miller & Mosher

[57] ABSTRACT

An apparatus using a battery as a power source requires a battery having an extended life time. A burden upon a battery can be reduced by operating the inner circuit at a low voltage and current. The present invention aims at providing a compact and low power consuming apparatus. A battery used as a power source drives a circuit for a low voltage circuit system and a switching circuit which switches power supply when the battery voltage becomes a preset voltage. A circuit for a high voltage circuit is directly driven by the battery when the battery voltage is high, and the circuit is powered from the output (for example, 1.5 volts) of a step-up circuit when the battery voltage is low. Switching of power sources is made in such a manner, resulting in low power consumption. Extension of life time of battery, and reduction in size of battery and apparatus can be achieved.

8 Claims, 5 Drawing Sheets

POWER SUPPLY CIRCUIT

BACKGROUND OF THE INVENTION

1. Field of the Invention

The present invention relates to a circuit for supplying power to an apparatus which uses a battery as a power source.

2. Description of the Prior Art

The voltage of a power source which comprises a battery has constraints.

In FIG. 1, a reference numeral 1 denotes a battery; 2 a low voltage circuit system; 3 a voltage step up circuit; 4 a high voltage circuit system. In the thus formed power source, the circuits which are operated at a battery voltage are directly driven with a battery, and the other circuits are driven at a necessary voltage which is stepped up by the step up circuit.

The electric power which is consumed by the circuit of the high voltage circuit system is represented as the product of the stepped up voltage, the conducted electric current and the inverse of the efficiency of the step up circuit. The electric power which is consumed by a low voltage circuit system is represented as the product of the battery voltage and the conducted current. Since the life time of the battery depends upon the power consumed by the high voltage circuit system 4 in FIG. 1, efforts have been made to reduce the conducted current and to enhance the efficiency of the step-up circuit 3. However, there have been constraints in these efforts.

An approach to protect a power source when the voltage of a battery is momentarily lowered is disclosed in Japanese Patent Application (JP-A-2-51335, published Feb. 21, 1990) entitled "BATTERY POWER SOURCE EQUIPMENT". This apparatus does not necessarily aim at reducing power consumption and has different merits.

SUMMARY OF THE INVENTION

It is an object of the present invention to provide a power supply circuit which overcomes the above mentioned problems and lowers the average voltage of a high voltage circuit system and is capable of suppressing the power consumption even if the conducted current is constant.

It is another object of the present invention to provide a power supply source which is suitable for intermittent control of power supply for mobile communication and extension of the life time of a battery.

In order to accomplish the above mentioned objects, the present invention provides a power supply circuit which compares a battery voltage with a power source switching preset voltage or a predetermined reference voltage for switching power sources and switches the power sources to a battery or a step up circuit output when the battery voltage is higher or lower than the reference voltage, respectively.

The power supply circuit may comprise a semiconductor circuit.

The power supply circuit of the present invention enables even the high voltage circuit system to be directly driven with a battery voltage when it is high (for example ≧ 1.3 Volts) and to be driven with the output of the step up circuit when the battery voltage is low. Since it is not necessary to use the step up circuit when the battery voltage is high, the power consumption can be suppressed. Therefore, the life time of the battery can be extended.

DESCRIPTION OF THE PREFERRED EMBODIMENTS

Figure 1:
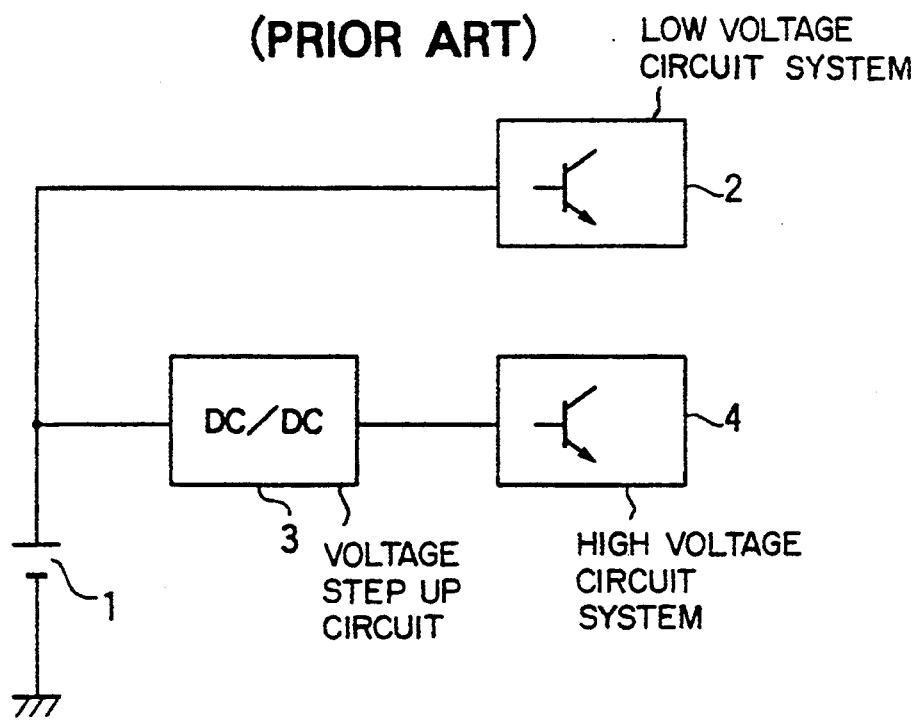
FIG. 1 is a block diagram showing a prior art power supply circuit.
Figure 2:
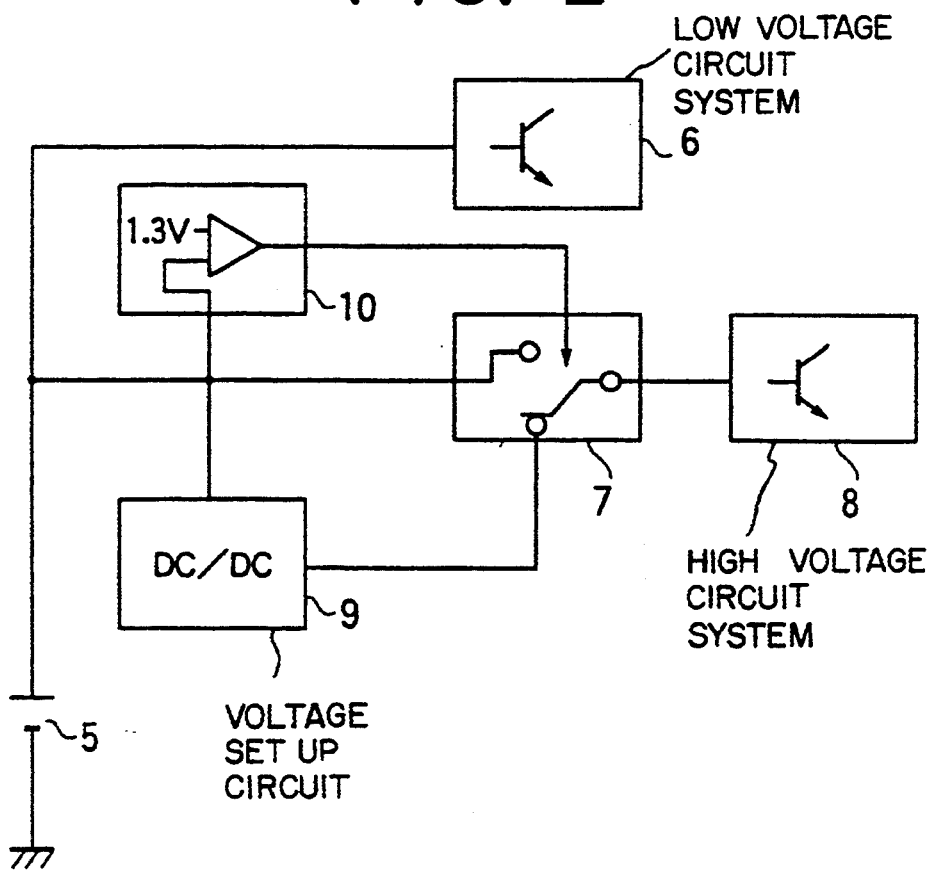
FIG. 2 is a block diagram showing a first embodiment of a power supply circuit of the present invention.

An embodiment of the present invention will be described with reference to FIG. 2. In FIG. 2, a reference numeral 5 denotes a battery; 6 denotes a low voltage circuit system or a first load which is directly powered by the battery; 7 denotes a switching circuit for switching power sources; 8 a high voltage circuit system or a second load which is powered with an output of the switching circuit 7; 9 a voltage step up circuit for stepping up the voltage of the battery 5; and 10 a voltage detecting circuit which detects the voltage of the battery 5 for generating a detection signal.

Now, operation in the present embodiment will be described.

Figure 7:
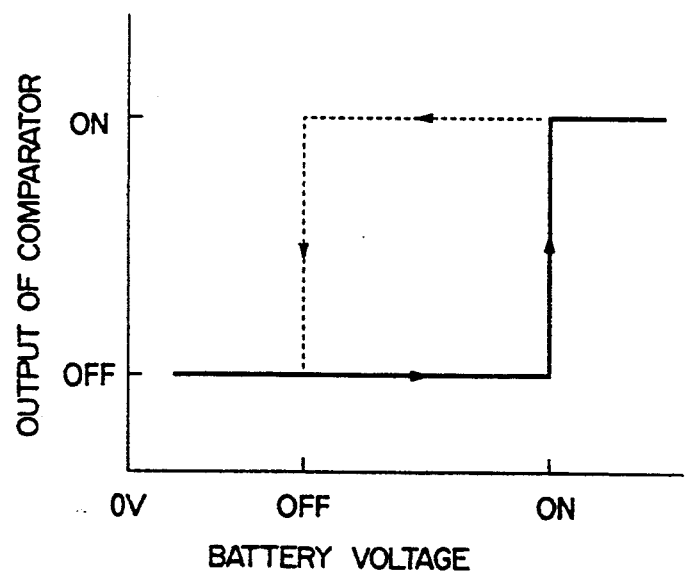
FIG. 7 is a graph showing an example of the hysteresis characteristics of a comparator used in the present invention.

The circuit which is operative at a voltage within a predetermined range not less than, for example, 1 volt of the power source is connected with the low voltage circuit system 6 when the power supply voltage is limited to only a single battery cell of 1.5 volts. A circuit which operates at a voltage within a predetermined range not less than, for example, 1.3 volts is connected with the high voltage circuit system 8. The voltage detection circuit 10 compares the battery voltage with an inner reference voltage of 1.3 volts and connects the battery 5 with the high voltage circuit system 8 by the switching circuit 7 when the battery voltage is 1.3 volts and higher. When the battery is fresh, for example, at about 1.6 volts to 1.3 volts, saving power consumption is achieved by direct drive with the battery. When the battery voltage is not higher than 1.3 volts, the power sources are switched by the switching circuit 7 so that the output of the step up circuit which is at 1.5 volts is used as a power source. The comparator used in the voltage detection circuit 10 comprises an operational amplifier made of an IC which is operative at 1.5 volts so that the comparator has a hysteresis characteristic of 50 mV. This prevents the power supply from becoming unstable due to chattering in the comparator which occurs due to change in the battery voltage by the influence of load current in the vicinity of 1.3 volts of the battery voltage, which is the power supply switching preset value. In other words, when the battery voltage is below 1.3 volts, the power source is switched from the battery to the step up circuit when the battery voltage is below 1.3 volts. In order to return the power source from a step up circuit to the battery, the battery voltage of 1.35 volts or higher is necessary due to the hysteresis of 50 mV. Even if the change in battery voltage near switching preset value is 50 mV, chattering of the power supply system will not occur. The voltage supply system can be stabilized. Hysteresis characteristics of the comparator are shown in FIG. 7.

The consumed power is represented as the product of the battery voltage and the conducted current when power is directly supplied by the battery and is represented as the product of the step up voltage, the conducted current and the inverse of the step up efficiency when power is supplied through the step up circuit. Power consumption can be saved in compliance with a loss of the step up circuit by direct drive of the battery, resulting in an extension of the life time of the battery.

Figure 3:
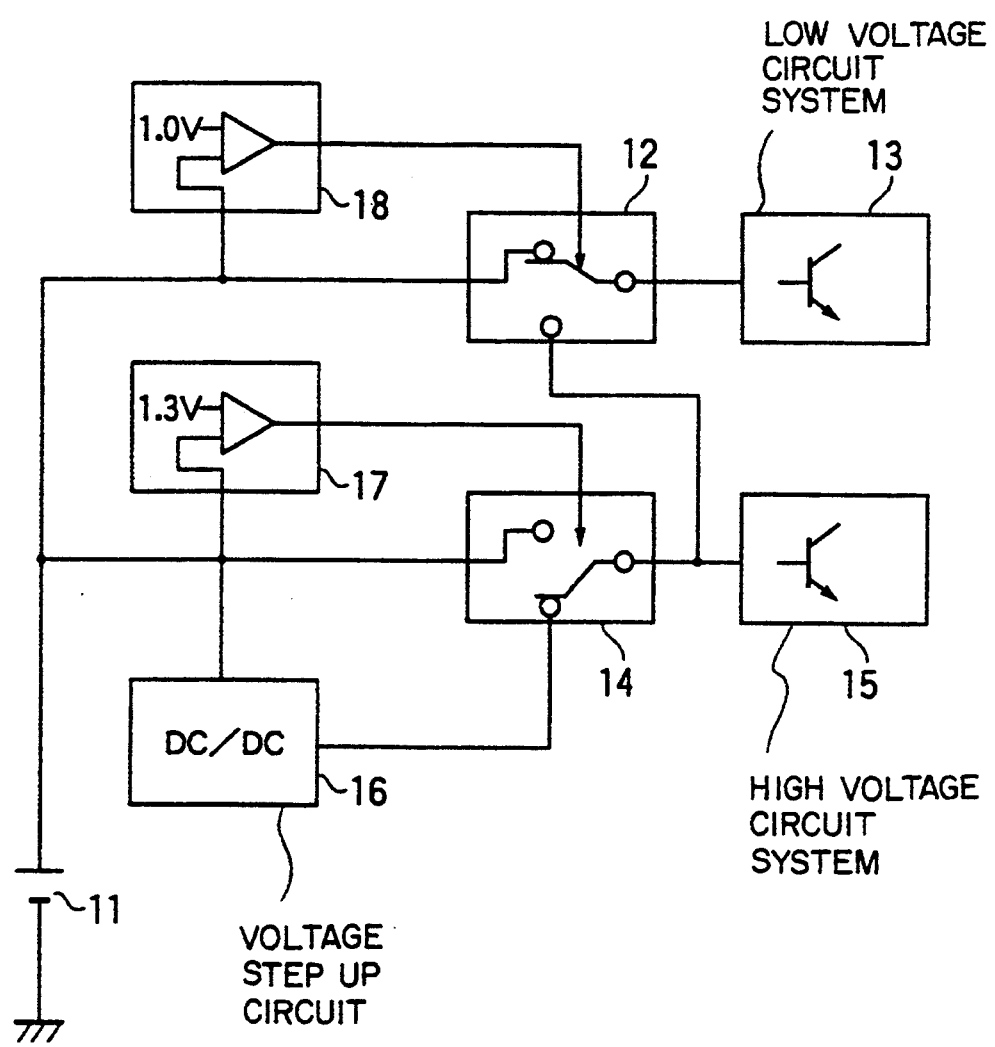
FIG. 3 is a block diagram showing a second embodiment of a power supply circuit of the present invention.

Now, a second embodiment of the present invention will be described with reference to FIG. 3. In FIG. 3, a reference numeral 11 denotes a battery; 12 a second switching circuit; 13 a low voltage circuit system; 14 a first switching circuit; 15 a high voltage circuit system; 16 a voltage step up circuit; 17 a first voltage detection circuit; 18 a second voltage detection circuit.

The present embodiment is substantially identical with the first embodiment in structure excepting that the low voltage circuit system 13 is provided with an output of the second switching circuit 12 and the second voltage detecting circuit 18. The first and second voltage detecting circuits 17 and 18 compare the battery voltage with the inner reference voltages of 1.3 volt and 1.0 volt for switching the power sources by the switching circuit 14 and 12, so that both the low and high voltage circuit systems 13 and 15 are directly powered from the battery when the battery voltage is 1.3 volts and higher, and so that the low voltage circuit system 13 is directly powered from the battery and the high voltage circuit system 15 is powered from the output of the step up circuit 16 when the battery voltage is not lower than 1.0 volts, and lower than 1.3 volts and for switching the power sources by the switching circuits 12 and 14 so that both the low and high voltage circuit systems 13 and 15 are powered from the output of the step up circuit 16, respectively.

Similarly to the first embodiment, the second voltage detection circuit 18 is also provided with the hysteresis of 50 mV to prevent chattering of the detection circuit 18 from occurring due to change in the battery voltage caused by load current.

Switching of the power sources from the battery to the output of the step up circuit 16 enables both the low and high voltage circuits 13 and 15 to work until the battery voltage falls to near the minimum operative voltage of the step up circuit even if the battery voltage is not higher than 1.0 volt and enables the life time of the battery to be extended. In other words, the same effect as that power consumption is saved can be obtained.

It is to be understood that the present invention is not limited to two high and low voltage circuit systems and is not limited to a single battery.

A third embodiment of the present invention will be described with reference to FIGS. 4 and 5.

Figure 4:
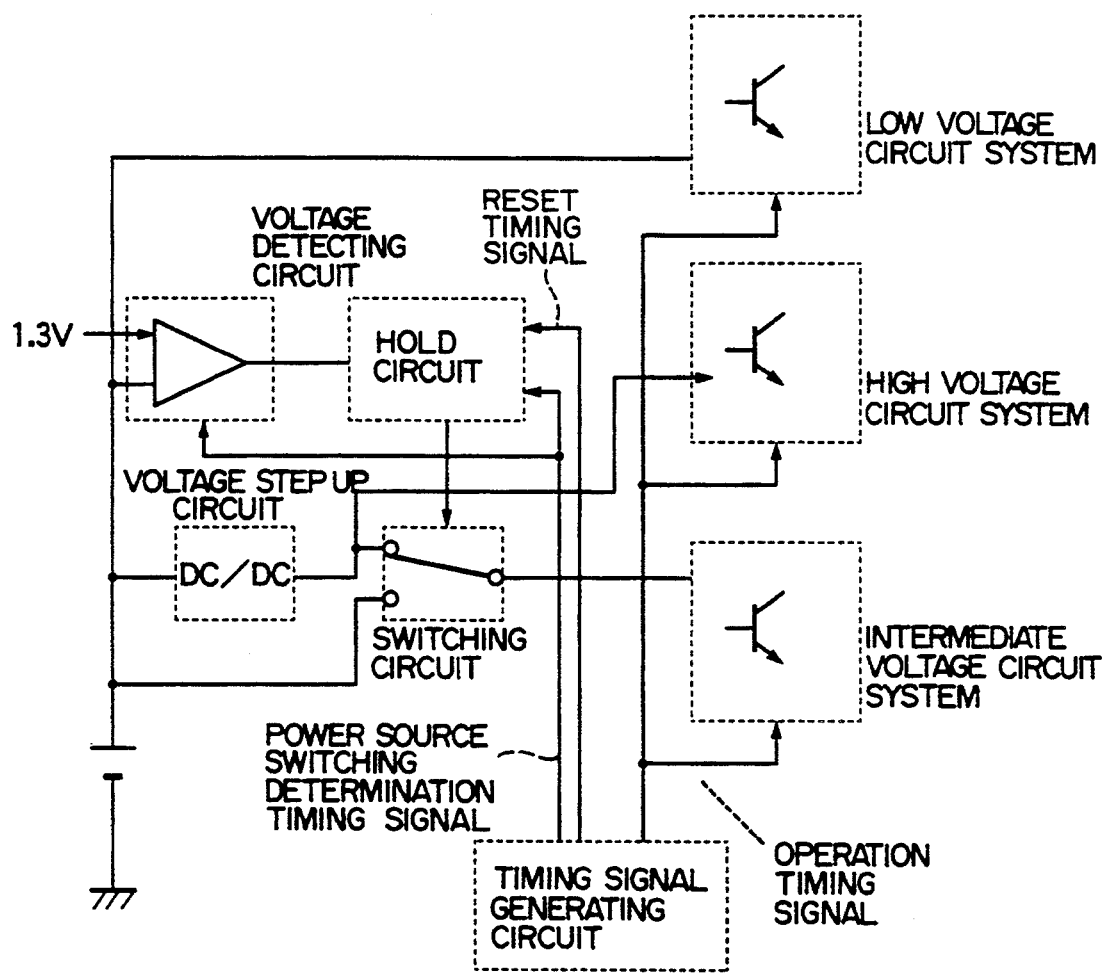
FIG. 4 is a block diagram showing a third embodiment of a power supply circuit of the present invention.
Figure 5:
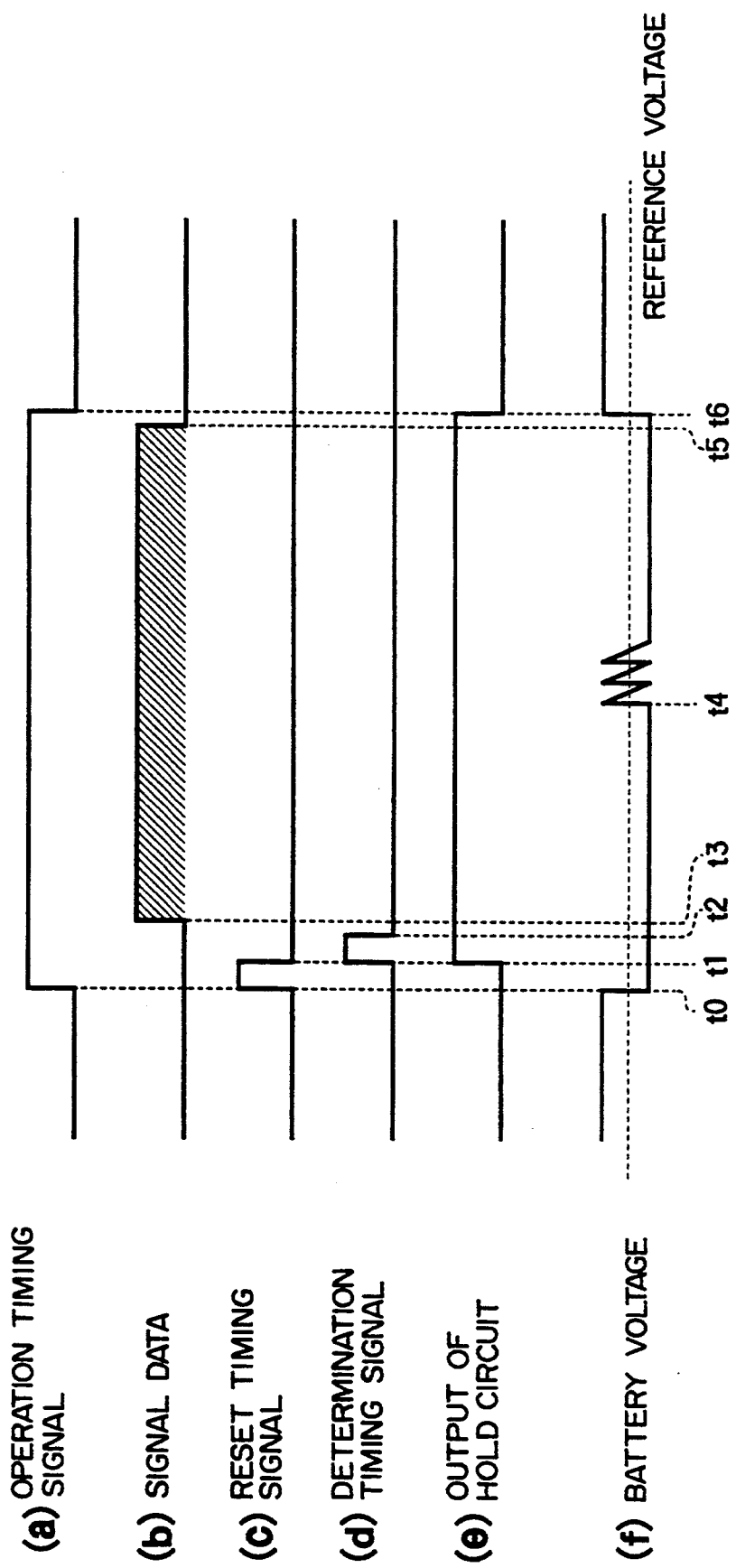
FIG. 5 is a time chart showing the operation timing of the power supply circuit of the third embodiment.

In FIGS. 4 and 5, a timing signal generating circuit which comprises CMOS circuits including a reference oscillator receives necessary signal data for a period of time from t3 to t5 and generates an operation timing signal for controlling the operation of the apparatus from t0 to t6, a reset timing signal for resetting the data of a hold circuit from t0 to t1 and a timing signal for determining the switching of power sources from t1 to t2.

The hold circuit comprises a general R-S flip-flop circuit and holds a high level state when the output of the voltage detection circuit is in a high level state and the reset timing signal and the power source switching determination timing signal are in low level states and holds the low level state in the other conditions.

The voltage detection circuit is controlled in response to the power source switching determination timing signal so that it is active or inactive when the power source switching determination timing signal is in a high or low level, respectively.

A low voltage circuit system is operative when the battery voltage is 1.0 volt or higher. A high voltage circuit system is operative when the output of the step up circuit is 1.8 volts or higher. An intermediate voltage circuit system is operative at the voltage of 1.2 volts or higher.

When the hold circuit is in a high or low level, the intermediate voltage circuit system is connected with the step up circuit or the battery by the switching circuit, respectively.

When the operation timing signal is changed to the high level state from the low level state, the high and low voltage circuit systems begin their operation. When the reset timing signal is in the high level, the output of the hold circuit becomes a low level, and the high voltage circuit system assumes an initial state in which it is powered by the battery. At the time t1 when the circuits in the present apparatus have been stable, the voltage detecting circuit compares the battery voltage with a reference voltage in response to the determination timing signal for changing its output if the reference voltage is higher than the battery voltage. The changed state is held by the hold circuit so that the power supply circuit switches power sources for the high voltage circuit system to a DC/DC converter from the battery. After the determination timing signal has changed from the high level state to the low level state at the time t2, power source switching operation is never performed by the hold circuit even if battery voltage changes at the time of t4 due to a change in load of each voltage circuit system or noise. Therefore, wrong operation of the apparatus due to noise from the power supply and the like when the apparatus is operated can be prevented, so that the apparatus can be normally operated.

Figure 6:
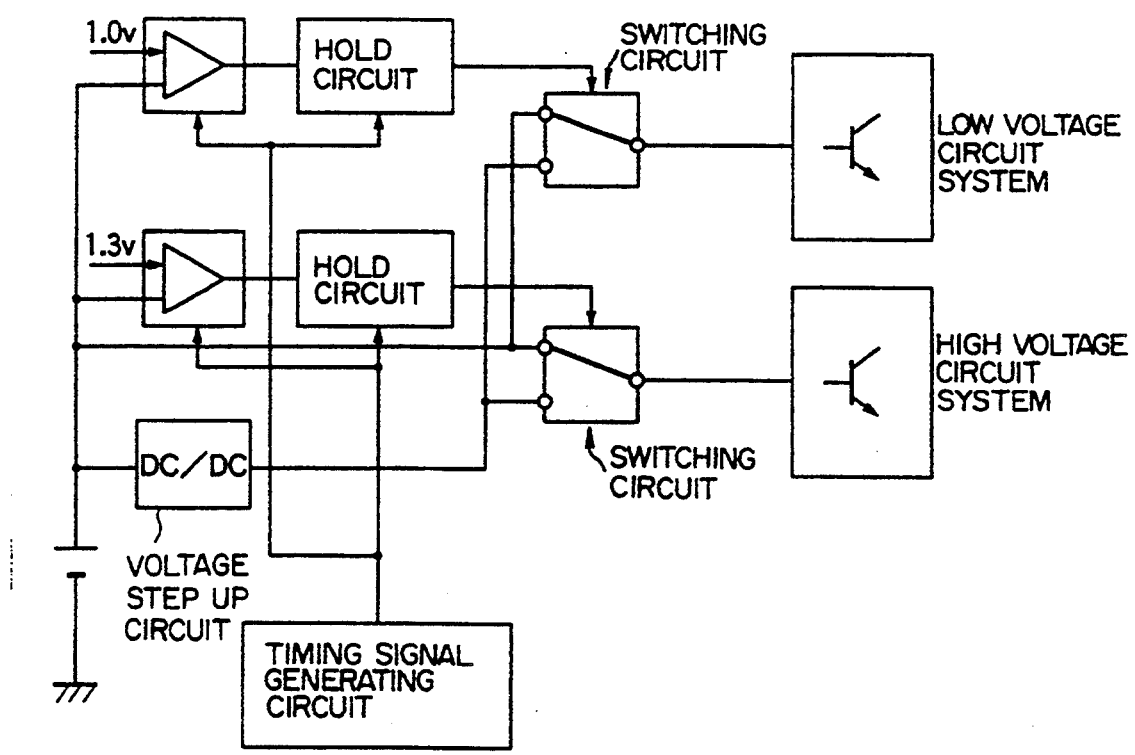
FIG. 6 is a block diagram showing a power supply circuit in which a part of the third embodiment is altered.

FIG. 6 shows a modification of the third embodiment. In this modification, a low voltage circuit system is also powered from a DC/DC converter when the battery voltage is lowered.

As mentioned above, the present invention provides a power supply circuit comprising a battery used as a power supply, a voltage step up circuit for stepping up a battery voltage and a power source switching circuit for monitoring the battery voltage to switch the power sources from the battery to an output of the step up circuit when the battery voltage becomes a power source switching preset voltage. Therefore, power consumption can be saved, resulting in an extension of a battery. Fabrication of the power supply circuit of ICs provides a compact power supply circuit.

I claim:

1. A power supply circuit for supplying electric power from a power source of a battery to at least first and second loads, wherein said first load is operative when supplied with a voltage within a predetermined first voltage range not less than a predetermined first voltage level and said second load is operative when supplied with a voltage within a predetermined second voltage range not less than a predetermined second voltage level higher than said first voltage level, comprising:

means for supplying electric power directly from said power source to said first load;

a voltage detecting circuit for generating an output signal when a voltage of said power source becomes lower than a reference voltage predetermined based on said second voltage level;

a voltage step up circuit for stepping up the voltage of said power source and outputting the stepped up voltage; and means for supplying electric power from said power source to said second load and including a switching circuit for connecting said power source directly to said second load in an absence of the output signal of said voltage detecting circuit and connecting said stepped up voltage to said second load in the presence of the output signal of said voltage detecting circuit.

2. A power supply circuit as defined in claim 1, wherein said voltage detecting circuit is provided with a hysteresis characteristic for said voltage of said power source.

3. A power supply circuit as defined in claim 1, further including:

a timing signal generating circuit for generating control signals which control supplying of electric power to said at least first and second loads and operation of said voltage detecting circuit and said switching circuit intermittently so that said switching circuit switches a connection of said second load between said power source and said voltage step up circuit when at least one of said at least first and second loads is operative.

4. A power supply circuit as defined in claim 3, further including:

a voltage hold circuit in an output side of the voltage detecting circuit for holding said output signal of said voltage detecting circuit for a predetermined period of time in response to said control signals from said timing signal generating circuit.

5. A power supply circuit as defined in claim 4, wherein said control signals comprise a reset timing signal for resetting said voltage hold circuit and a determination timing signal, generated after said reset timing signal, for controlling operation of said voltage detecting circuit and said voltage hold circuit.

6. A power supply circuit as defined in claim 4, wherein said predetermined period of time for holding said output signal of said voltage detecting circuit in said voltage hold circuit is extended without immediately resetting the voltage hold circuit if a change in said voltage of the power source detected by the voltage detecting circuit exceeds a given range.

7. A power supply circuit for supplying electric power from a power source of a battery to at least first and second loads, wherein said first load is operative when supplied with a voltage within a predetermined first voltage range not less than a predetermined first voltage level and said second load is operative when supplied with a voltage within a predetermined second voltage range not less than a predetermined second voltage level higher than said first voltage level, comprising:

a voltage step up circuit for stepping up the voltage of said power source and outputting the stepped up voltage;

a first voltage detecting circuit for generating an output signal when a voltage of said power source becomes lower than a first reference voltage predetermined based on said first voltage level;

means for supplying electric power from said power source to said first load and including a switching circuit for connecting said power source directly to said first load in an absence of the output signal of said first voltage detecting circuit and connecting said stepped up voltage to said first load in a presence of the output signal of said first voltage detecting circuit;

a second voltage detecting circuit for generating an output signal when a voltage of said power source becomes lower than a second reference voltage predetermined based on said second voltage level; and means for supplying electric power from said power source to said second load and including a switching circuit for connecting said power source directly to said second load in an absence of the output signal of said second voltage detecting circuit and connecting said stepped up voltage to said second load in a presence of the output signal of said second voltage detecting circuit.

8. A power supply circuit as defined in claim 7, further including:

a timing signal generating circuit for generating control signals which control supplying of electric power to said at least first and second loads and operation of said first and second voltage detecting circuits and said switching circuits intermittently so that each of said switching circuits switches a connection of a corresponding one of said at least first and second loads between said power source and said voltage step up circuit when at least one of said at least first and second loads is operative.

* * * * *